United States Patent [19]
Heinrichs

[11] Patent Number: 5,588,486
[45] Date of Patent: Dec. 31, 1996

[54] DOWN-HOLE GAS SEPARATOR FOR PUMP

[75] Inventor: Bernard Heinrichs, Calgary, Canada

[73] Assignee: Elan Energy Inc., Calgary, Canada

[21] Appl. No.: 412,557

[22] Filed: Mar. 29, 1995

[30]   Foreign Application Priority Data

Mar. 30, 1994 [CA] Canada ................................. 2120283

[51] Int. Cl.⁶ .................................................. E21B 43/38
[52] U.S. Cl. ......................................... 166/50; 166/105.5
[58] Field of Search ...................... 166/50, 105.5

[56]   References Cited

U.S. PATENT DOCUMENTS

| 2,719,024 | 9/1955 | Prescott et al. ............... | 166/50 X |
| 2,748,719 | 6/1956 | Wells ............................. | 166/105.5 |
| 5,040,619 | 8/1991 | Jordan et al. ................. | 166/50 X |
| 5,113,937 | 5/1992 | Cholet ........................... | 166/105.5 |
| 5,154,588 | 10/1992 | Freet ............................ | 417/423.3 |
| 5,271,725 | 12/1993 | Freet et al. ................... | 166/105.5 X |

FOREIGN PATENT DOCUMENTS 1601360 10/1990 U.S.S.R. ............................... 166/105.5

Primary Examiner—Hoang C. Dang
Attorney, Agent, or Firm—Schwegman, Lundberg, Woessner & Kluth, P.A.

[57]   ABSTRACT

A down-hole gas separator for a pump provides for the pumping of liquids from the lower portion of an inclined or horizontal passageway. The separator includes a nozzle for connecting to a pump inlet. The nozzle has an inlet and an outlet. The nozzle outlet is connected to the pump inlet. The separator is provided with means to cause the nozzle inlet to seek a lowermost position.

16 Claims, 7 Drawing Sheets

DOWN-HOLE GAS SEPARATOR FOR PUMP

FIELD OF THE INVENTION

This invention relates in general to inlets for down-hole liquid pumps and more particularly to a down-hole gas separator for use in an inclined or horizontal passsageway such as a wellbore, pipe or the like.

BACKGROUND OF THE INVENTION

Oil is removed from underground reservoirs after the drilling of a wellbore. In the past, wellbores were approximately vertical. Perforations were made in the casing to permit oil to flow into the wellbore from the reservoir. The inlet for the pump was lowered on tubing to the region of the wellbore below where the oil entered the wellbore and the liquids were pumped to the surface.

A more recently developed technique for oil extraction involves the drilling of a wellbore into an oil reservoir at an angle to the vertical. In some cases the wellbore is approximately horizontal. Oil in reservoirs contain gas and are accompanied by free gas. When liquids are produced along horizontal or inclined wellbores, the gas separates and is located at the top of the wellbore. Liquid oil is present along the lower portion of the wellbore.

Conventional pump inlets, when used in inclined or horizontal wellbores, usually entrain both liquid oil and gas. This results in inefficiencies in pumping because the gas occupies space in the pump. The entrainment of too much gas can cause "gas locking" which may result in temporary stoppage of flow through the pump.

Prior art systems have been devised to address the aforenoted problems. For example, larger pumps were used to try to overcome the inefficiencies of pumping. Another proposed solution was the design of devices to separate the gas from the liquid within the pump inlet as shown in U.S. Pat. No. 5,113,937 issued on May 19, 1992, which uses a device attached to the free end of the pipe stem attached to the pump inlet. The device uses a check valve system and pressure differentials to draw liquid from different parts of the device but would not readily function in a horizontal wellbore to efficiently pump the liquid oil from the bottom portion of the wellbore.

SUMMARY OF THE INVENTION

One aspect of the present invention is to provide an improved gas separator.

In accordance with one aspect of the present invention there is provided a gas separation unit for use with a liquid pump inlet within a horizontal or inclined passageway. The unit includes a nozzle having first and second portions. The first portion of the nozzle is provided with an opening for liquid ingress. The second portion of the nozzle is adapted to be connected to the liquid pump inlet so that liquid entering the nozzle through the opening is drawn into the liquid pump inlet. The unit is also provided with means for causing the opening in the nozzle to seek a lowermost position and be spaced apart from the passageway.

BRIEF DESCRIPTION OF THE DRAWINGS

Detailed descriptions of the preferred embodiments are provided hereinbelow with reference to the following drawings, in which.

DETAILED DESCRIPTION OF THE PREFERRED EMBODIMENT

The invention will be more readily understood with the explanation provided below of embodiments of the invention with reference to the accompanying Figures.

Figure 2:
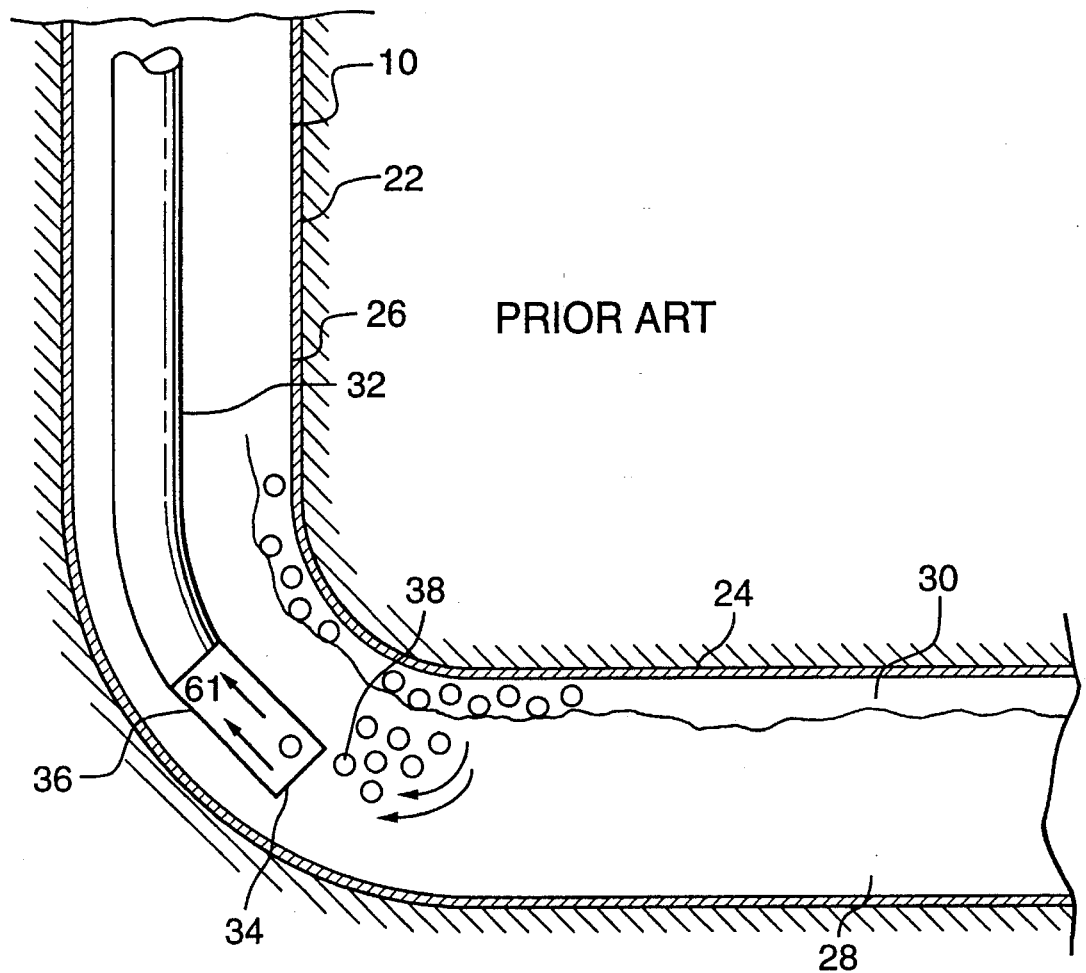
FIG. 2 is a schematic side view of a prior art horizontal wellbore pump inlet.

FIG. 2 illustrates a typical wellbore 10 having a vertical portion 22 and a horizontal portion 24. The wellbore is lined with casing 26. Within the horizontal portion 24 of the wellbore is liquid oil 28 and gas 30. Tubing 32, which is lowered down the wellbore, ends at inlet 34. Inlet 34 may be either the inlet to a submersible pump 36 as shown in FIG. 2 or may be a pipe acting as an extension to the pump inlet located closer to the surface. Normal pumping action in this prior art arrangement results in the gas 30 being entrained with the liquid oil 28 into the pump as shown by the gas bubbles 38 in FIG. 2.

Figure 3:
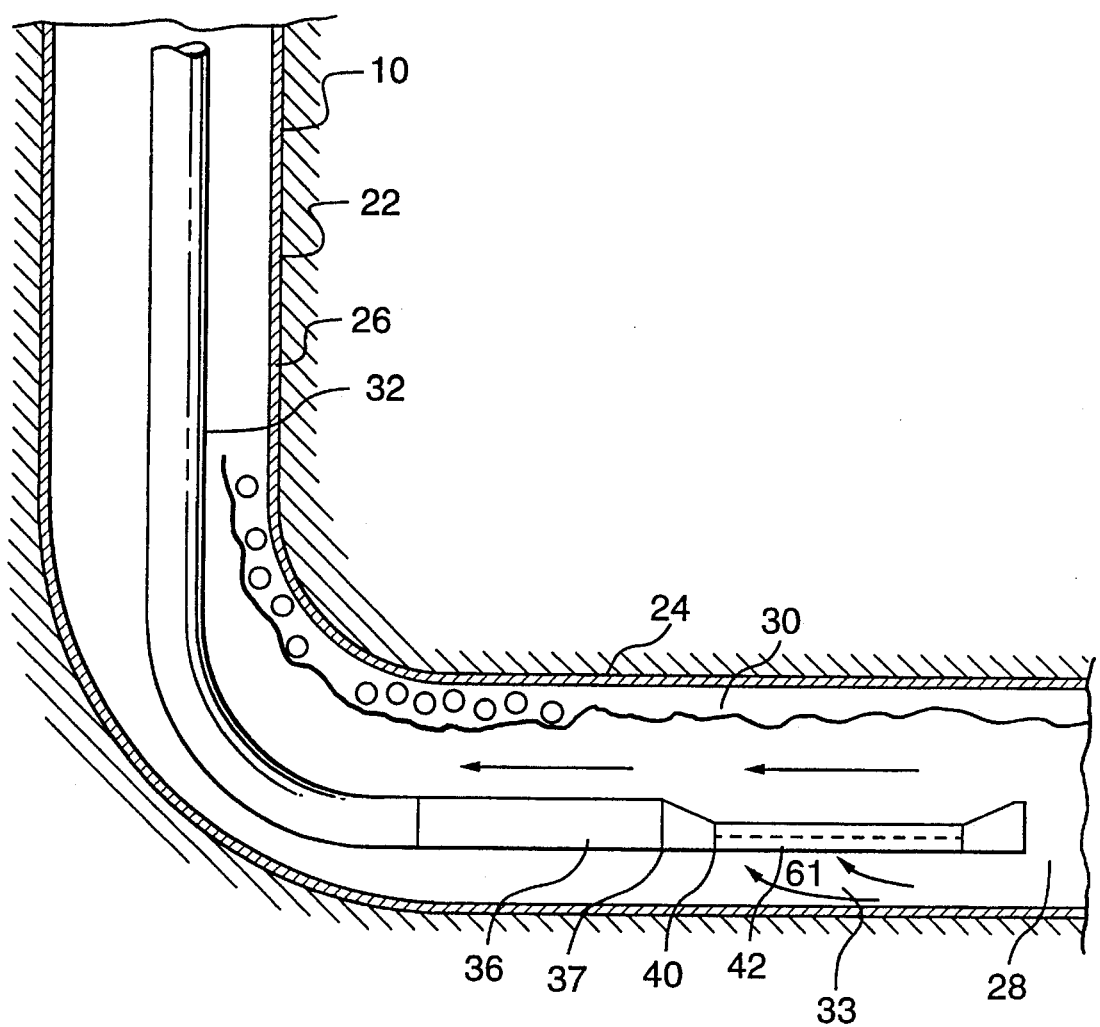
FIG. 3 is a schematic side view of the gas separator unit of FIG. 1 in operation in a horizontal wellbore.

The first embodiment of the present invention is illustrated in FIG. 3 where like numbers correspond to the same elements shown in FIG. 2. A gas separator unit 40 is attached to a pump inlet 37, but may instead be attached to a pipe acting as an extension to the pump inlet (not shown in FIG. 3). Due to the structure of the gas separator unit of the present invention, liquid oil from the lower portion 33 of the horizontal wellbore is drawn into the nozzle 42 located on the lowermost side of the gas separator unit.

Figure 1:
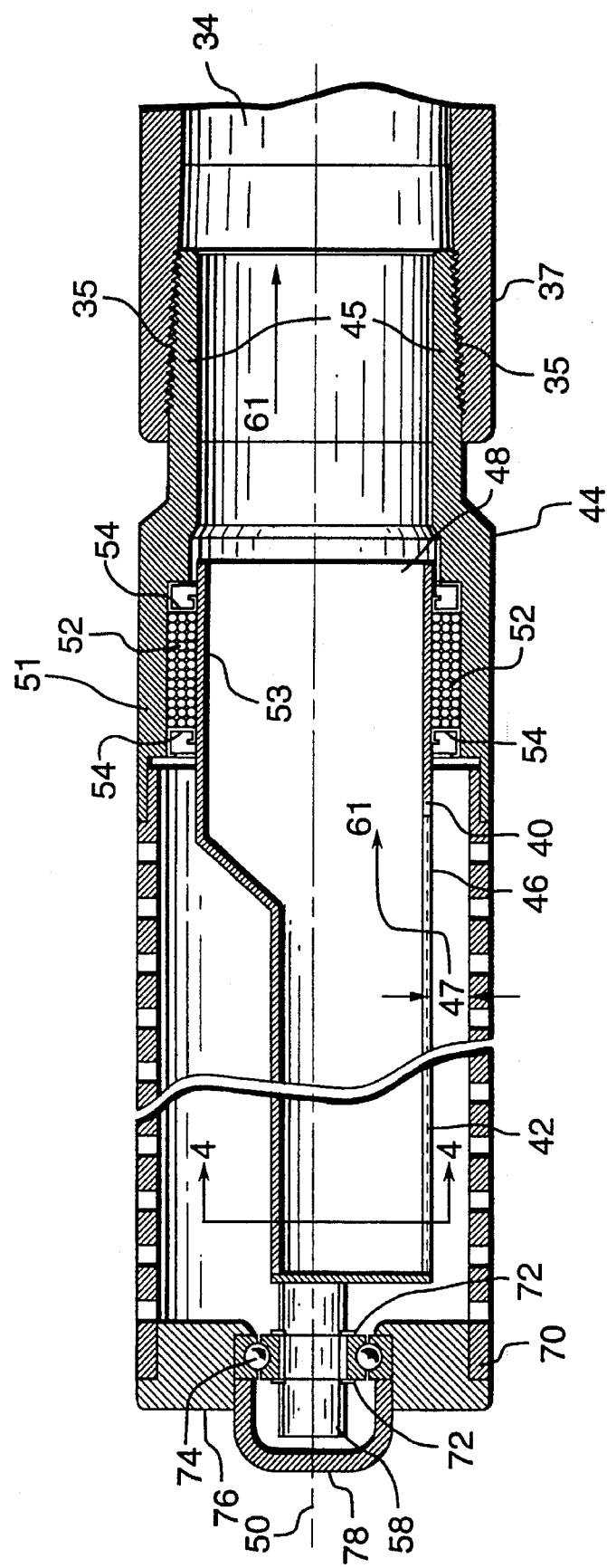
FIG. 1 illustrates, in an axial sectional view, a gas separation unit made in accordance with a first embodiment of the present invention.
Figure 5:
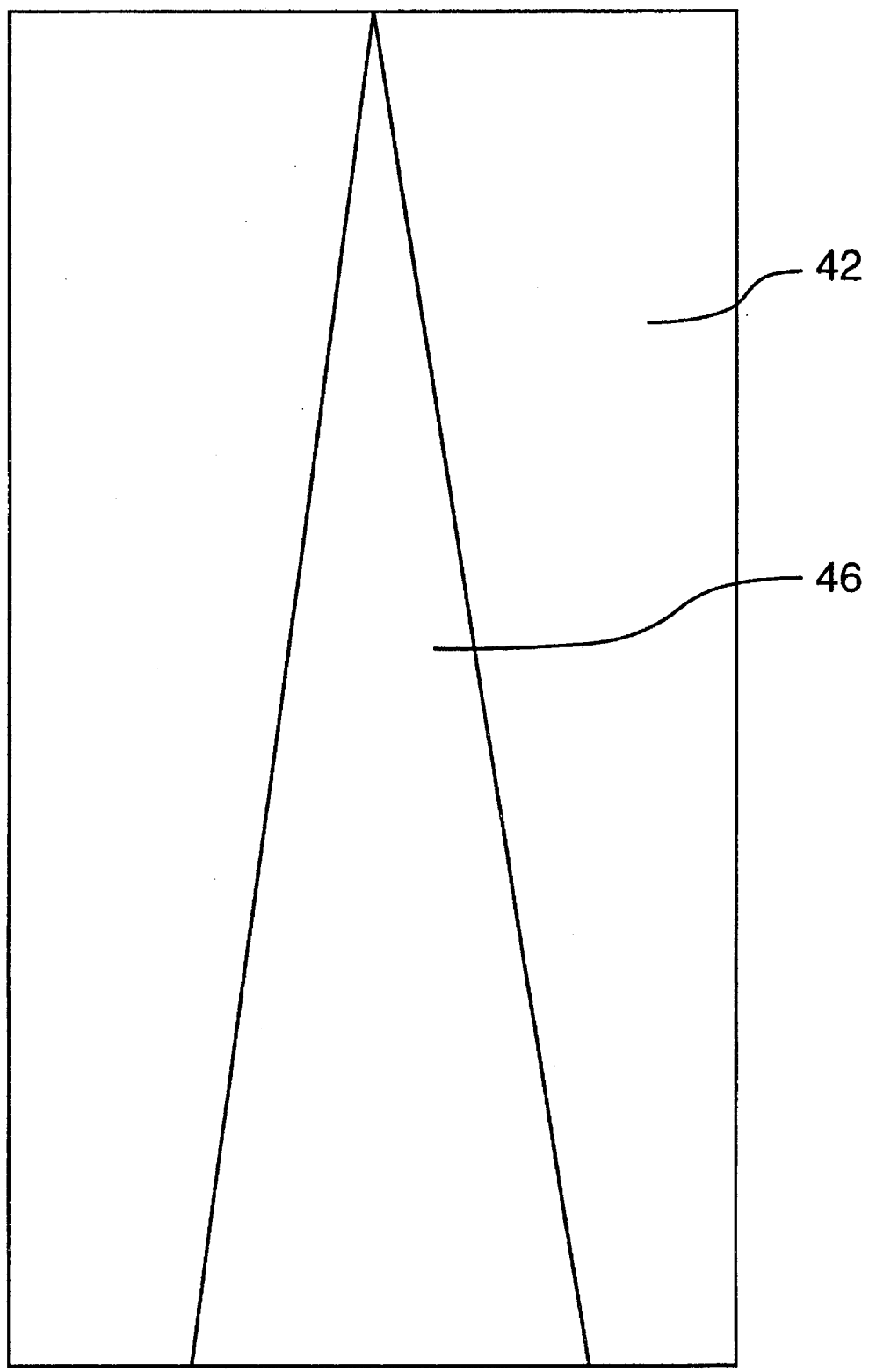
FIG. 5 is a bottom plan view of the opening provided in the bottom of the gas separation unit nozzle.

In FIG. 1, the first embodiment of the invention is provided with a nozzle 42 which is mounted on pump 34. The nozzle inlet 46 is a tapered elongate slot provided along the nozzle's lowermost portion and is more clearly shown in FIG. 5. The taper is shaped so that the opening is greater at the end of the nozzle most distant from the pump, so as to better equalize the suction forces along the length of the nozzle inlet. The nozzle 42 has a generally cylindrical portion 53 which defines opening 48 and is connected to the pump inlet 37 through adapter 44. Adapter 44 is provided with outer threads 45 which threadably engage internal threads 35 in pump inlet 37.

The nozzle 42 is adapted to freely rotate about axis 50. The nozzle is supported at nozzle portion 53 by bearings 52 mounted between the outside of nozzle portion 53 and the inside of the generally cylindrical portion 51 of the adapter 44. Seals 54 secured around the bearings 52 prevent the flow of gas or liquid from the outside of the nozzle to the interior of the adapter 44.

The nozzle 42 is enclosed by a housing 70. Housing 70 is provided with distributed openings 57 to permit liquid oil within the wellbore to enter the housing and for gas within the housing to escape to the annular space between the housing and the casing. At the end of the nozzle most distant from the pump, the nozzle 42 is provided with stub shaft 58 which is aligned with the axis of rotation 50. Stub shaft 58 has spaced-apart circumferential grooves receiving snap rings 72 which enclose a bearing 74 mounted in a protective end cap 76 on housing 70. Protective cap 78 covers stub shaft 58.

For efficient pumping, it is preferred that the fluid flow (indicated by the arrows 61 in FIGS. 1 to 4, 6 and 7) through the gas separation unit not be constrained or choked. Accordingly, the area of the nozzle inlet 46 is approximately twice the cross-sectional area of the pump inlet 37. Likewise, the total area of the openings 57 in the housing 70 is approximately four times the cross-sectional area of pump inlet 37. The flow should also not be restricted in the annular space between the nozzle inlet 46 and the housing 70 (or casing where no housing is used). Thus the distance 47 measured when the nozzle inlet is in the lowermost position between the nozzle 40 and the housing 70 (or the casing when no housing is present) should be greater than twice the cross-sectional area of pump inlet 37 divided by the axial length of the nozzle inlet 46.

Figure 4:
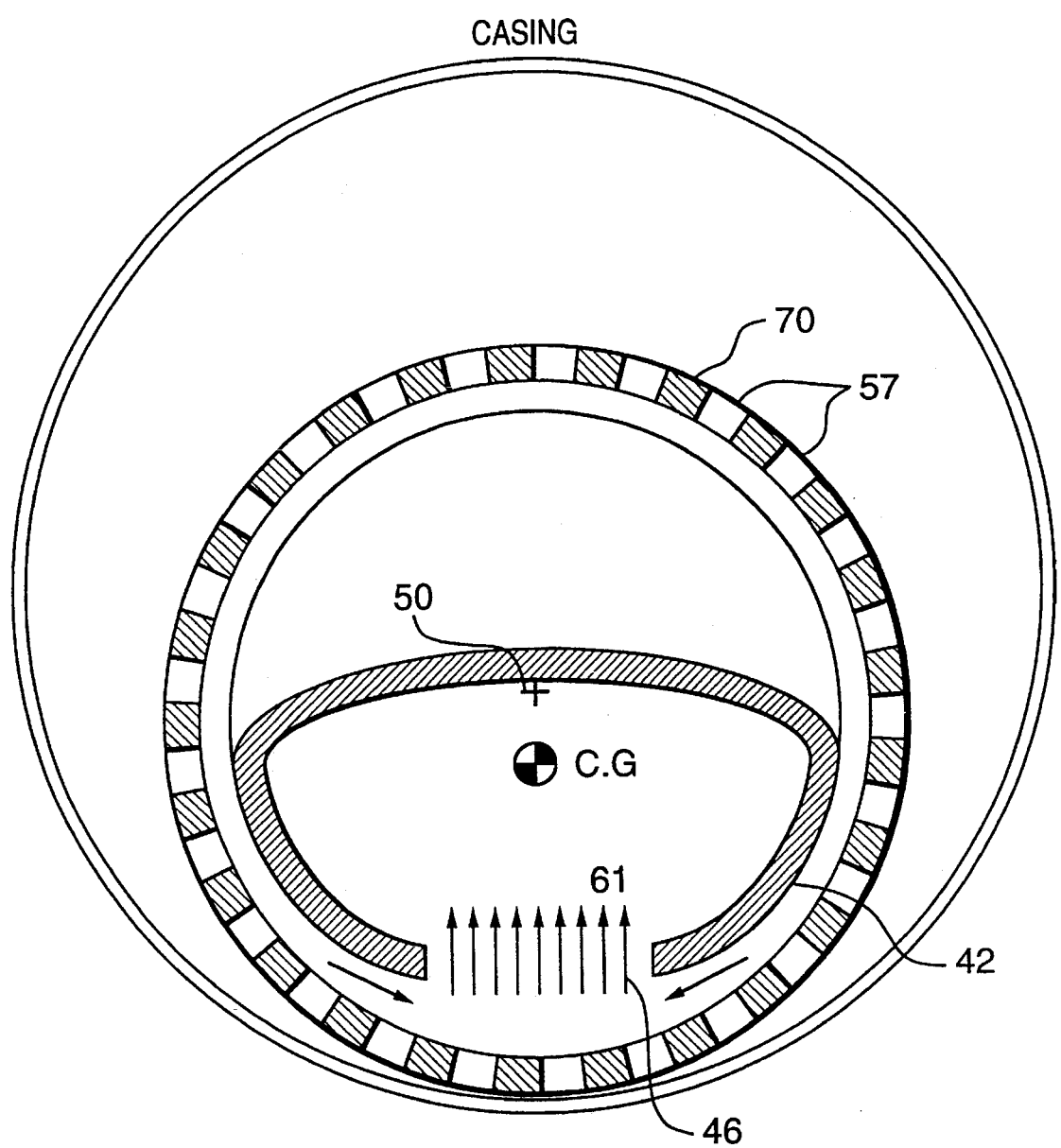
FIG. 4 is a cross-sectional view of the gas separation unit of FIG. 1 while placed in a horizontal wellbore taken at the line 4—4 shown in FIG. 1.

As will be appreciated from FIGS. 1 and 4, nozzle 42 has an asymmetric weight distribution. The center of gravity of the nozzle shown in FIGS. 1 and 4 is located between the axis of rotation 50 and the nozzle inlet 46 and is identified as "CG" in FIG. 4. As a result, the force of gravity acts to provide a rotational moment to the nozzle resulting in the nozzle inlet 46 maintaining a lowermost position even if the pump or housing rotates relative to the wellbore.

Figure 6:
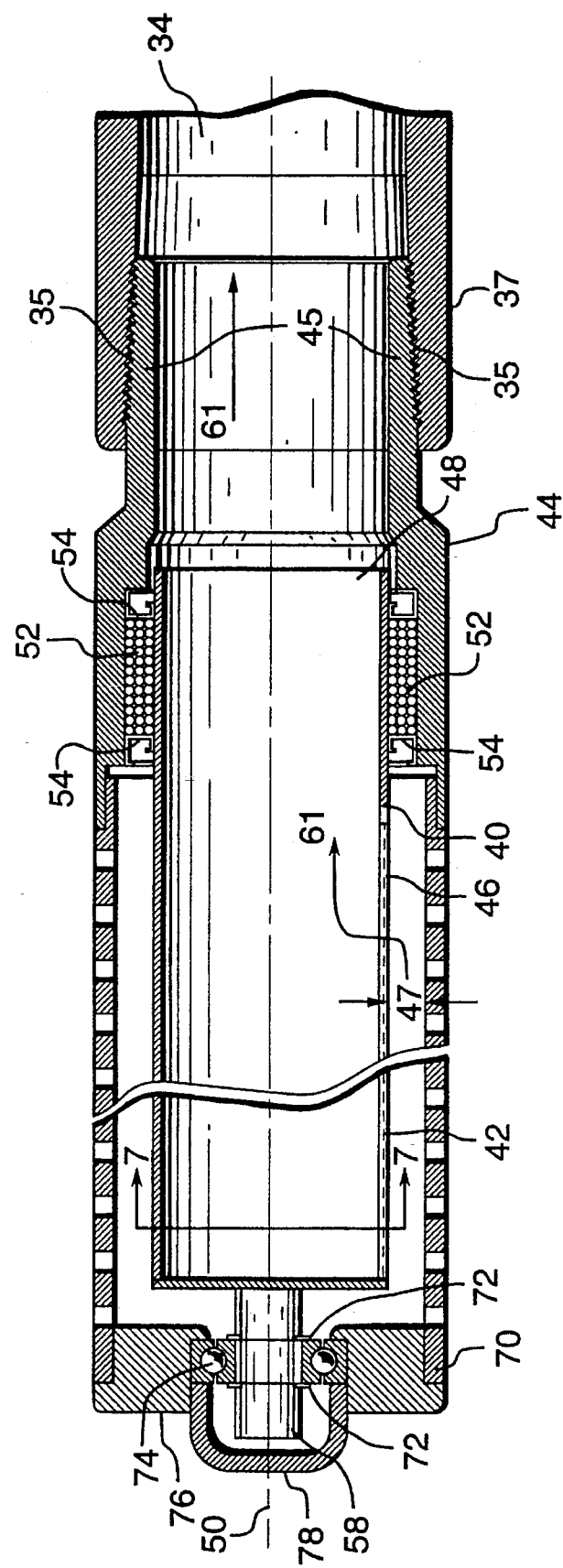
FIG. 6 is a vertical axial sectional view of a gas separation unit made in accordance with the second embodiment of the present invention.
Figure 7:
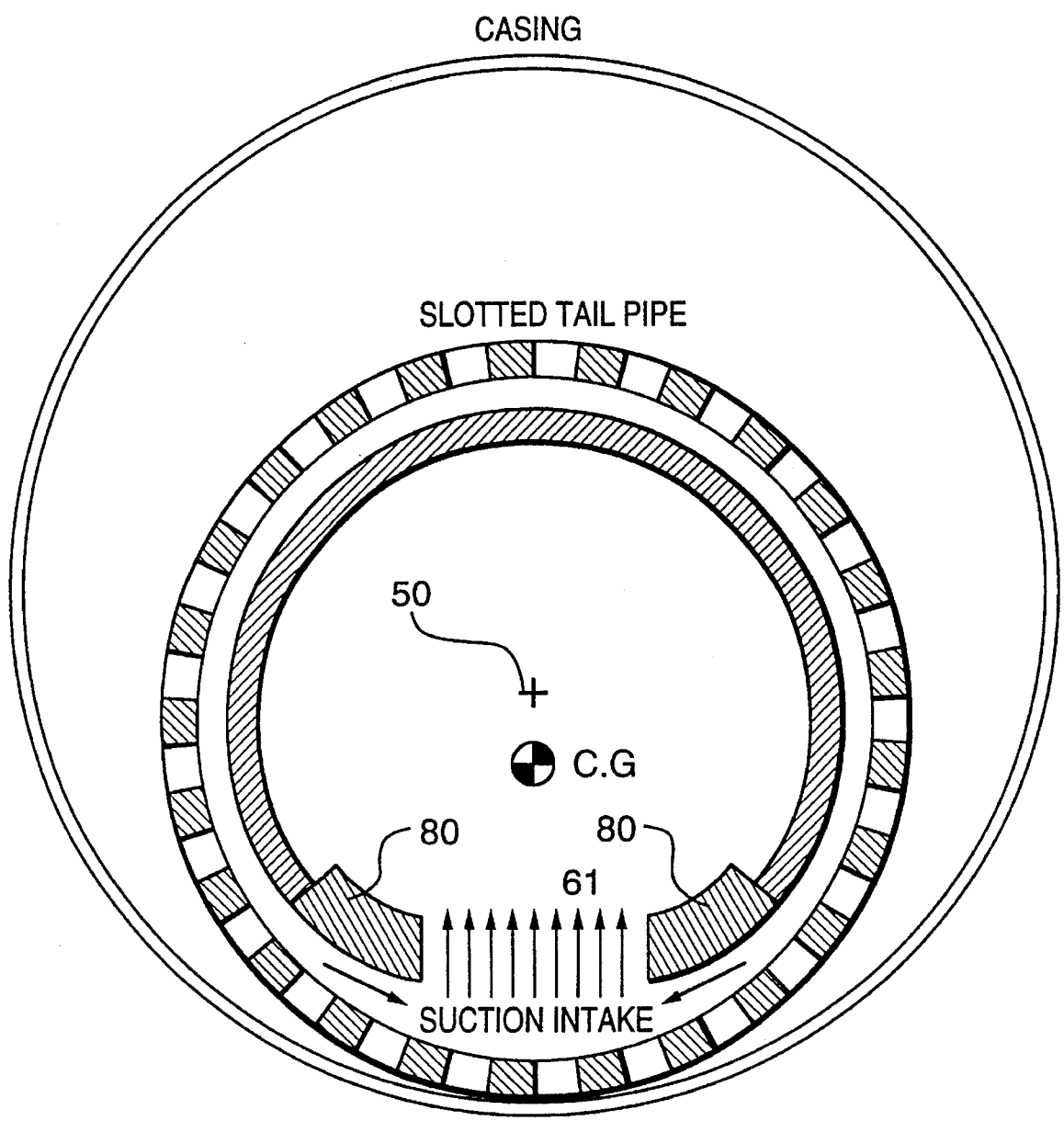
FIG. 7 is a cross-sectional view of the gas separation unit of FIG. 6 while placed in a horizontal wellbore taken at the line 7—7 in FIG. 6.

A second embodiment of the nozzle is illustrated in FIGS. 6 and 7 where the asymmetric weight distribution is achieved by placement of additional weights 80 adjacent the nozzle inlet. Such addition of weight also results in the center of gravity of the nozzle being located between the axis of rotation 50 and the nozzle inlet as shown by "CG" in FIG. 7.

Although the above description of the embodiments of the invention have dealt with the application of the invention for separation of liquid from gas in inclined or horizontal oil wellbores, the invention can be applied to any environment where liquid and gas need to be pumped from an inclined or horizontal passageway such as a wellbore, casing pipe or the like.

While two embodiments of this invention have been illustrated in the accompanying drawings and described above, it will be evident to those skilled in the art that changes and modifications may be made therein without departing from the essence of this invention. All such modifications or variations are believed to be within the sphere and scope of the invention as defined by the claims appended hereto.

The embodiments of the invention in which an exclusive property of privilege is claimed are defined as follows:

1. A gas separation unit for use with a liquid pump inlet within a horizontal or inclined passageway comprising:
   a. a nozzle having a proximal portion and a distal portion,
      i. said distal portion defining an inlet opening in the nozzle on only one side of said nozzle for liquid ingress and
      ii. said proximal portion adapted to be coupled to the liquid pump inlet so that liquid entering the nozzle through the inlet opening is drawn into the liquid pump inlet;
   b. said distal portion including counterweight means for causing the nozzle inlet opening to seek a lowermost position; and
   c. means for spacing apart said nozzle and said passageway.

2. The gas separation unit of claim 1, wherein said nozzle is mounted for free rotation about an axis.

3. The gas separation unit of claim 2 wherein the center of gravity of said nozzle is offset from said axis, whereby gravity induces a rotational force on said nozzle to result in the nozzle inlet opening seeking said lowermost position.

4. The gas separation unit of claim 3, wherein said nozzle is radially asymmetric.

5. The gas separation unit of claim 4 wherein said unit is further provided with an adapter connecting the nozzle to the liquid pump inlet and wherein said free rotation is provided by bearings rotatably connecting the proximal portion of the nozzle to the adapter.

6. The gas separation unit of claim 5 wherein said inlet opening is tapered along a line generally parallel to said axis to provide for approximately uniform suction along the length of the inlet opening.

7. The gas separation unit of claim 6 wherein said gas separation unit is further provided with a housing enclosing said nozzle, said housing being provided with holes for allowing gas and liquid to pass between the inside of the housing and the outside of the housing and the nozzle inlet opening is spaced apart from the housing.

8. The gas separation unit of claim 7 wherein said nozzle is provided with a shaft disposed along said longitudinal axis, said shaft being received by a bearing secured in said housing.

9. The gas separation unit of claim 8 wherein said passageway is the casing of a wellbore.

10. The gas separation unit of claim 3 wherein said counterweight means comprises weights mounted on said distal portion of the nozzle adjacent said inlet opening for eccentrically weighting said nozzle, thereby offsetting the center of gravity of said nozzle from said axis, whereby gravity induces a rotational force on said nozzle to result in the nozzle inlet opening seeking said lowermost position.

11. The gas separation unit of claim 10 wherein said unit is further provided with an adapter connecting the nozzle to the liquid pump inlet and wherein said free rotation is provided by bearings rotatably connecting the proximal portion of the nozzle to the adapter.

12. The gas separation unit of claim 11 wherein said inlet opening is tapered along a line generally parallel to said axis to provide for approximately uniform suction along the length of the inlet opening.

13. The gas separation unit of claim 12 wherein said gas separation unit is further provided with a housing enclosing said nozzle, said housing provided with holes for allowing gas and liquid to pass between the inside of the housing and the outside of the housing and the nozzle inlet opening is spaced apart from the passageway by said housing.

14. The gas separation unit of claim 13 wherein said nozzle is provided with a shaft disposed along said longitudinal axis, said shaft being received by a bearing secured in said housing.

15. The gas separation unit of claim 14 wherein said passageway is the casing of a wellbore.

16. A gas separation unit for use with a liquid pump inlet within a horizontal or inclined passageway comprising:
   a. a tubular nozzle having a proximal end, a distal end, and an inlet portion,
      i. said inlet portion of said nozzle defining an inlet opening in the nozzle on only one side of said nozzle for liquid ingress, said inlet opening extending from said distal end toward said proximal end, and ii. said proximal end being adapted to be coupled to the liquid pump inlet so that liquid entering the nozzle through the inlet opening is drawn into the liquid pump inlet;

b. means for mounting the nozzle for free rotation about an axis;

c. a housing enclosing said nozzle and spacing said nozzle apart from said passageway; and d. the center of gravity of the nozzle being offset from said axis, whereby gravity induces rotational force on said nozzle to result in the nozzle inlet opening seeking a lowermost position even if the pump or the housing rotates relative to the passageway.

* * * * *